Dec. 19, 1961    F. PESSL ET AL    3,013,837
PIVOTED VEHICLE SEAT
Filed July 1, 1960    3 Sheets-Sheet 1
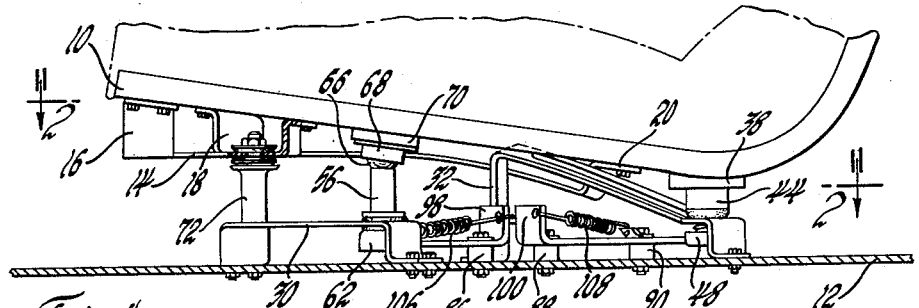
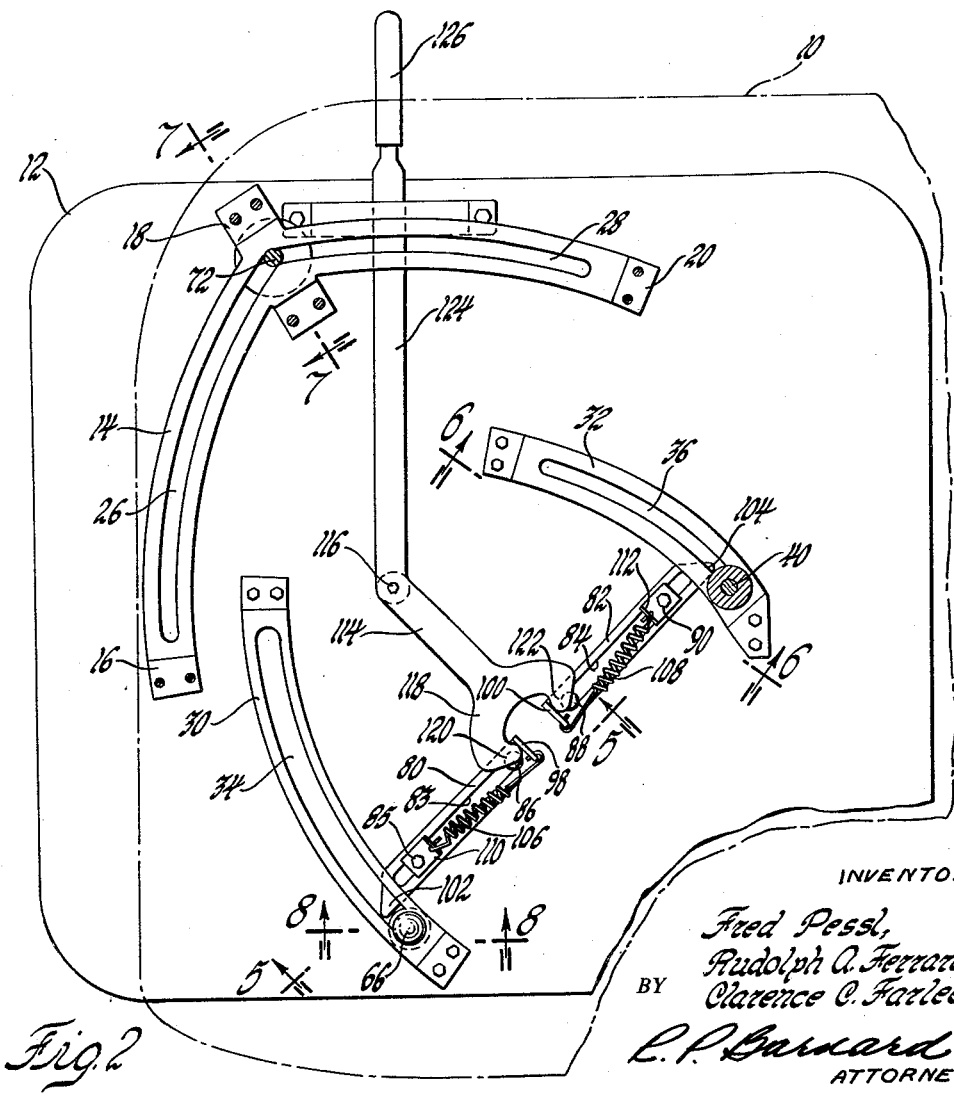
INVENTORS
Fred Pessl,
Rudolph A. Ferrara &
Clarence C. Farlee
BY
C. P. Barnard
ATTORNEY Dec. 19, 1961  F. PESSL ET AL  3,013,837
PIVOTED VEHICLE SEAT Filed July 1, 1960  3 Sheets-Sheet 2

INVENTORS
Fred Pessl,
Rudolph A. Ferrara &
BY Clarence C. Farlee

R. P. Barnard
ATTORNEY

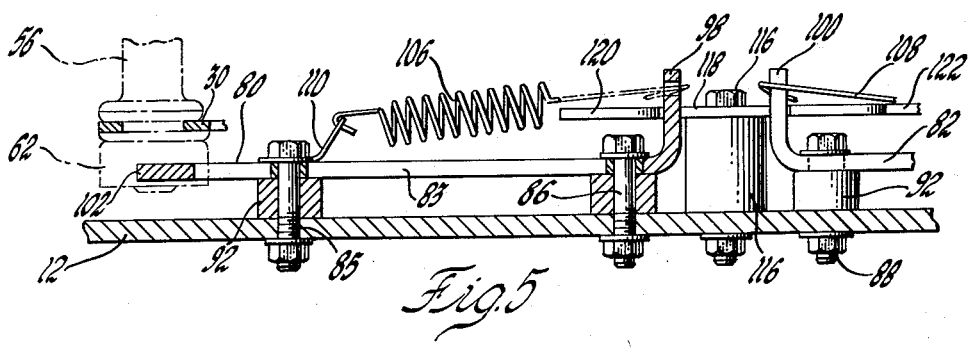
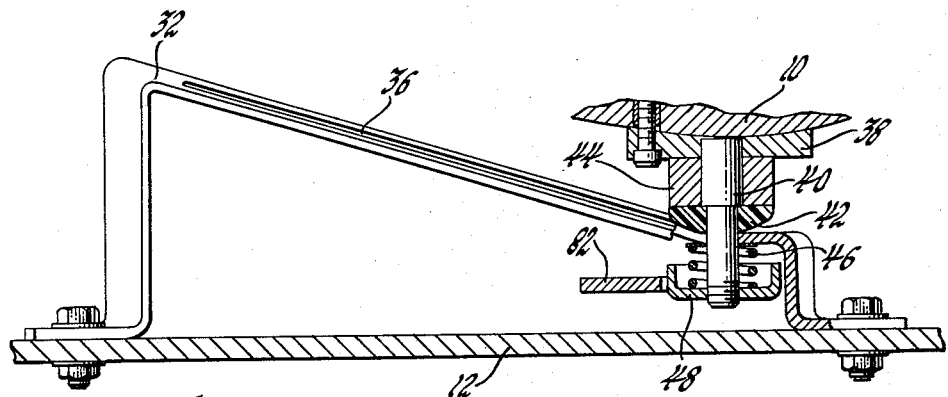
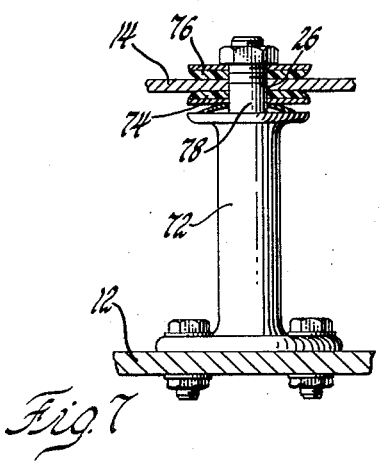
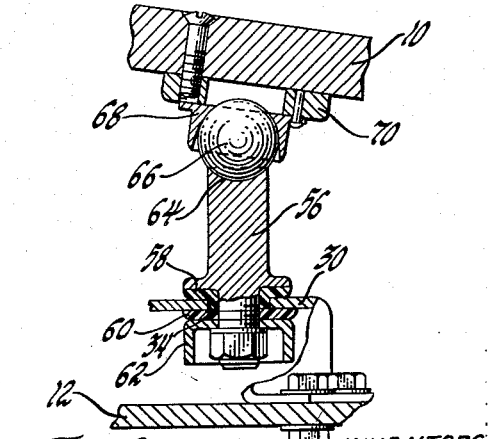

United States Patent Office 3,013,837
Patented Dec. 19, 1961

3,013,837
PIVOTED VEHICLE SEAT
Fred Pessl, Grosse Pointe Woods, Rudolph A. Ferrara, St. Clair Shores, and Clarence C. Farlee, Utica, Mich., assignors to General Motors Corporation, Detroit, Mich., a corporation of Delaware
Filed July 1, 1960, Ser. No. 40,437
6 Claims. (Cl. 296—65)

This invention relates to improvements in automobile seats and more particularly to improvements in front seats of automobiles of the type which are swivel mounted to permit a seat to be swung to different positions to permit more convenient ingress and egress to and from an automobile.

The invention consists in improvements in double swivel front seats of automobiles of the two-door type wherein rear seat passengers must enter and leave the automobile through doors adjacent the front seats of the vehicle.

The objects of this invention are to provide a vehicle front seat movable to a position accommodating rear seat passenger movement in and out of the vehicle; to further provide a seat which is pivotally movable and which is also adjustable in fore and aft directions; to provide a vehicle seat that is pivotally supported for positioning in opposite directions; to provide a seat which is pivotally movable and additionally tilted forwardly during one pivotal movement to provide access to the space behind the seat back; and to provide special track means adapted to accommodate pivotal and tilting movement of a seat.

Other objects and advantages of the present invention will be apparent from the following detailed description and by reference to the accompanying drawings wherein:

FIGURE 1 is a side elevational view of an illustrative seat embodiment of the invention;

FIGURE 2 is a sectional view taken along the line 2—2 in FIGURE 1 and showing the seat in normal position;

FIGURE 5 is an enlarged sectional detail view taken along the line 5—5 in FIGURE 2;

FIGURE 6 is an enlarged sectional detail view taken along the line 6—6 in FIGURE 2;

FIGURE 7 is an enlarged sectional detail view taken along the line 7—7 in FIGURE 2; and FIGURE 8 is an enlarged sectional detail view taken along the line 8—8 in FIGURE 2.

Figure 3:
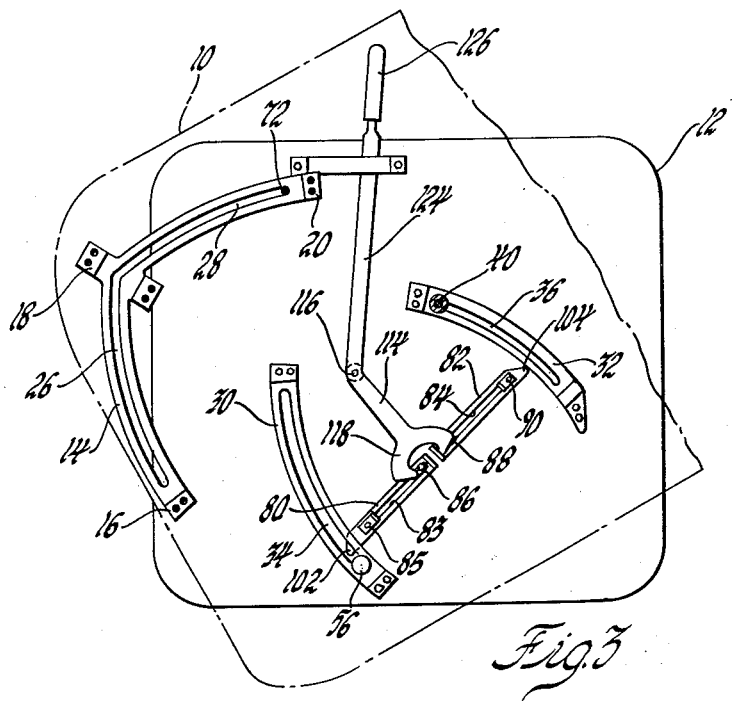
FIGURE 3 is a sectional view taken along the line 2—2 in FIGURE 1 and showing the seat in an alternative position.

Referring now to FIGURE 1, a seat frame 10 of the bucket type and adapted for use in the front compartment of a conventional two-door automobile having two opposite side doors is illustrated. As is conventional, one of the seat frames is provided adjacent each of the doors and, since the devices, except for reversal of certain features, are substantially identical, only one embodiment is described in detail. The seat frame 10 and the track mechanism are supported on a sub-assembly plate 12 that is suitably secured to the vehicle floor or may be mounted on conventional seat adjuster mechanisms which provide for horizontal movement of the seat and for vertical adjustment thereof.

To provide for pivotal movement of the seat frame 10 to permit easy access to the front seat, an upper track member 14 is provided adjacent the front and one side of the seat frame and is suitably secured thereto by bracket portions 16, 18, 20. Trackways are provided in the track member by intersecting curved slots 26, 28. A pair of lower track members 30, 32 are secured to the sub-assembly plate 12 and have central portions spaced upwardly therefrom. Curved slots 34, 36 are provided in each central portion to form trackways parallel to the trackways 26 and 28, respectively. Thus the curved slots 26, 34 and 28, 36 have different radii of curvature and common centers in the normal forward facing position of the seat frame 10 as illustrated in FIGURE 2. The track member 32 curves upwardly and diagonally forwardly and the side portion of the upper track member 14 curves downwardly and rearwardly for a purpose to be hereinafter described.

A pivotal support is located at the aforementioned center of the trackways 26, 34 and comprises a mounting plate 38 and a pivot pin 40 which are fixedly secured to the seat frame 10 as shown in detail in FIGURE 6. The pivot pin 40 is pivotally supported within the curved slot 36 provided on the curved track member 32 by a skid member 42 made of Teflon or other suitable bearing material. The skid is suitably spaced from the mounting plate 38 by a spacer sleeve 44, and the parts are suitably tensioned by a compression spring 46 concentrically disposed on the pivot pin 40 and seated beneath the track member against a stop washer 48 fixedly secured to the end of the pivot pin. The pivot pin 40 is, therefore, pivotally secured within the curved slot 36 and is slidable therein on the skid member 42. In the forwardly facing position of the seat frame 10, the pivot pin 40 is located at the lowermost extremity of the trackway provided by the curved slot 36 and is substantially aligned with the longitudinal center line of the seat frame. The track member 32 curves forwardly upwardly from the central position to a point outwardly displaced from the horizontal center line of the seat frame. The curved slot 28 and the curved slot 36 have different radii of curvature that have a common center in the normal seat position defined by a pivot pin 56 that is mounted on skid members 58, 60 and slidably positioned within the curved slot 34 of the lower frontal track member 30 as shown in FIGURE 8. The pivot pin 56 is secured within the curved slot by the provision of a stop washer 62 fixedly secured to the end thereof. The upper end of the pivot pin 56 is provided with a spherical recess 64 that accommodates a ball member 66 of a ball caster assembly 68 which is fixedly secured to a tapping block 70 fastened to the seat frame 10. The aforedescribed pivotal assemblies serve the dual functions of guide supports for a pivotal movement of the seat frame in their respective trackways and also as pivotal connections for movement of the seat frame along the trackways of which they provide centers.

Referring now to FIGURE 7, a third guide member is provided for the track member 14 and serves both the upper frontal trackway 26 and the upper side trackway 28, and comprises a guide support 72 that is fixedly secured to the sub-frame 12. Skid members 74, 76 which are made of Teflon or other suitable bearing material are secured about a reduced upper portion 78 of the support 72 on opposite sides of the track member 14. The skid members 76 slidably accommodate the adjacent surfaces of the curved slots 26, 28 provided in the track member 14 and the support 72 is positioned at the intersection of the trackways 26, 28 when the seat frame is in the normal forward facing position.

Control mechanism, illustrated in detail in FIGURE 5, is provided for restraining pivotal movement of the seat frame and comprises a pair of locking bars 80, 82 that are slidably mounted by central slots 83, 84 relative to support pins 85, 86, 88, 90 that secure the locking bars to the sub-frame 12 through spacer sleeves 92. Cam flanges 98, 100 are provided on one end of the locking bars 80, 82 and the other ends 102, 104 are adapted to slidably engage the peripheries of the stop washers 48, 62. Tension springs 106, 108 are fastened to the cam flanges 98, 100 and to spring plates 110, 112 fixedly secured to the support pins 85, 90. A locking bar actuating link 114 is provided with a pivotal supporting member 116 secured to the frame 12 and is provided with a forked end portion 118 having cam segments 120, 122 that are adapted for controlling engagement with cam flanges 98, 100 of the locking bars 80, 82. The other end 124 of the actuating link 114 extends outwardly from beneath the seat frame 10 to provide a handle portion 126.

Figure 4:
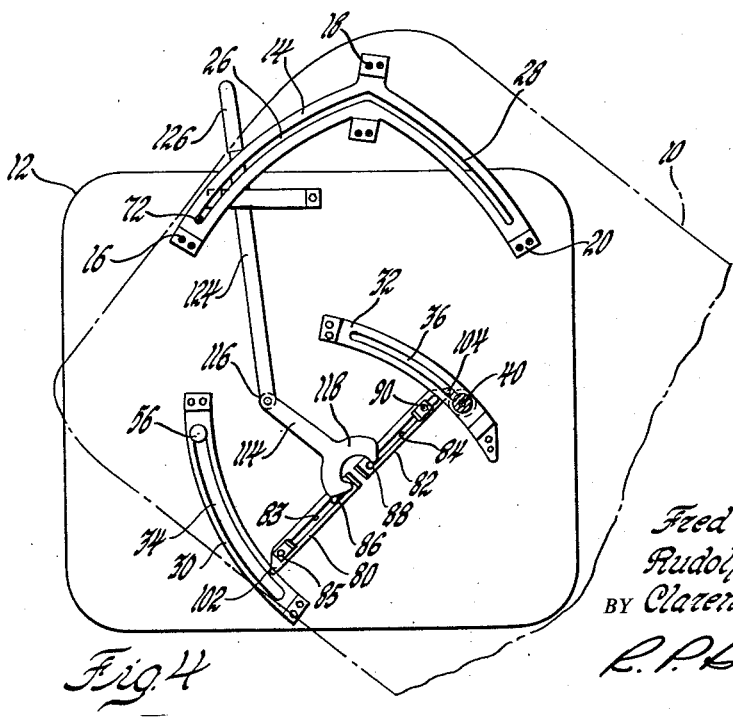
FIGURE 4 is a sectional view taken along the line 2—2 in FIGURE 1 and showing the seat in another position.

In operation, the seat frame may be actuated about the pivot pin 40 on the lower frontal trackway 34 and the upper frontal trackway 26 of the track member 14 by rotation of the actuating link 114 about its pivotal connection 116 to engage the cam segment 120 and the cam flange 98 to force the locking bar 80 away from engagement with the stop washer 62 against the bias of the tension spring 106. When the locking bar has been actuated, the seat may be pivoted about the pivot pin 40 with the skid members 58, 60 riding on the curved slot 34 and the skid members 74, 76 riding on the frontal curved trackway 26. In this manner the front of the seat frame may be rotated from its normal forward facing position to a doorway facing side position as shown in FIGURE 4 whereby a person entering the front seat may more easily seat himself. After the occupant is seated he may then pivot the seat back to its forward facing position and release the actuating link 114 whereupon the tension spring 106 will force the locking bar 80 back into locking engagement with the stop washer 62. When it is desired to accommodate passengers entering or leaving the rear of the automobile, the actuating link 114 is moved in the opposite direction whereby the cam segment 122 acting against the cam flange 100 forces the locking bar 82 away from locking engagement with the stop washer 48 against the bias of the tension spring 108. At this time the seat may be pivoted about the pivotal connection provided by the ball caster 68 and the support pin 56. As the seat is rotated the skid 42 slides along the upwardly curved track member 32 in the curved slot 36 and upper curved trackway 28 slides between the skid members 74, 76 provided on the guide support 72. The seat frame is thereby moved from a forward facing position to an inwardly facing side position as shown in FIGURE 3 and the rear door corner of the seat frame is thereby rotated out of blocking engagement adjacent the vehicle doorway to a position providing a wide path between the front door and the rear seat. During this movement the seat back is also tilted forwardly to a substantially vertical position by the movement on the upwardly curved trackways 28, 36 to further provide additional room for access to the rear seat. The upper trackway 28 and the lower side trackway 36 are similarly contoured so that, when the seat frame has reached the end of its pivotal travel, the seat back is substantially vertically aligned.

Although a preferred embodiment has been described and illustrated, obvious modifications in the details and arrangement of the parts are intended to be within the purview of this invention except as limited by the prior art and as defined by the appended claims.

We claim:

1. In a vehicle seat, a seat frame, a support frame, an upper track member fixed to said seat frame, said track member being provided with substantially transverse intersecting guideways, one of said guideways being positioned substantially parallel to the front of said seat frame, a lower track member fixed to said support frame, a guideway provided on said lower track member and being parallel to said one of said guideways provided on said upper track member, another lower track member being fixed to said support frame and provided with a guideway parallel to the other guideway of said upper track member, a guide member fixed to said support frame and being engageable with said guideways on said upper track member to slidably support said seat frame, a support means pivotally associated with said seat frame and being slidably supported on said other lower track member, a portion of said other lower track member being aligned with a pivot point common to said guideway of said lower trackway and to said one guideway of said upper trackway, a second support means providing a pivotal connection and being fixed to said seat frame and pivotally and slidably supported in said guideway of said lower track member, a portion of said guideway of said lower track member intersecting a pivot point common to said guideway of said other lower track member and said other guideway of said upper track member, and releasable means to lock said support means relative to their associated guideways at their respective common pivot points whereby the seat may be alternatively pivoted thereabout.

2. A swiveling mechanism for the front seat of an automobile which comprises, a seat frame carried in the passenger compartment of an automobile to support a front seat, a support member positioned beneath said seat support frame, a first swivel shaft pivotally connecting said seat frame to said support member, a second swivel shaft pivotally connecting said seat frame to said support member, curved trackway means having a radius of curvature with a center coaxially located with said second swivel shaft and said seat being movably positionable on said curved trackway means about said second swivel shaft, another curved trackway means having a radius of curvature with a center coaxially located with said first swivel means and said seat frame being movably positionable on said other curved trackway about said first swivel means, and disengageable latching means associated with said first swivel shaft and said second swivel shaft to permit alternate movement of said seat frame about one or the other of said swivel shafts.

3. In a vehicle seating apparatus positioned adjacent a vehicle doorway, a seat frame having a normal position facing forwardly of said vehicle, said seat frame including a base portion and a seat back portion, a support member located below said base portion of said seat frame, a pivotal connection between said base portion and said support member and located approximately on the longitudinal center line of the seat frame, track means having a curved pathway formed by radii centered at said pivotal connection, said track means being positioned and spaced forwardly of said pivotal axis and extendingly outwardly toward said vehicle door so that rotation of said seat frame about said pivotal axis moves the front of said seat frame from said normal forwardly facing position to a seat occupant receiving or discharging position facing said doorway, a second pivotal connection between said base portion of said seat and said seat frame located adjacent the side of said seat frame opposite said doorway, additional track means slidably supporting said seat frame, said additional track means providing a curved pathway having a radius centered on said second pivotal connection and extending rearwardly of said seat frame so that rotation of said seat frame about said second pivotal axis causes movement of the front of said seat frame from said normal forwardly facing position to a position facing away from said doorway and enlarging the space between said seat back and said doorway, said second track means being inclined to provide additional clearance between said seat back and said doorway as said seat frame is rotated about said second pivotal connection by forwardly tilting said seat back.

4. In vehicle seating apparatus positioned adjacent a vehicle doorway, a seat frame having a normal position facing forwardly of said vehicle, said seat frame including a base portion, a support member located below said base portion of said seat frame, a pivotal connection between said base portion and said support member and located approximately on the longitudinal center line of the seat frame, track means having a curved pathway formed by radii centered at said pivotal connection, said track means being positioned and spaced forwardly of said pivotal axis and extending outwardly toward said vehicle door so that rotation of said seat frame about said pivotal axis moves the front of said seat frame from said normal forwardly facing position to a seat occupant receiving or discharging position facing said doorway, a second pivotal connection between said base portion of said seat and said seat frame located adjacent the side of said seat frame opposite said doorway, additional track means slidably supporting said seat frame, and said additional track means providing a curved pathway having a radius centered on said second pivotal connection and extending rearwardly of said seat frame so that rotation of said seat frame about said second pivotal axis causes movement of the front of said seat frame from said normal forwardly facing position to a position facing away from said doorway and enlarging the space between said seat back and said doorway.

5. In vehicle seating apparatus positioned adjacent a vehicle doorway, a seat frame having a normal position facing forwardly of said vehicle, said seat frame including a base portion and a seat back portion, a support member located below said base portion of said seat frame, a pivotal connection between said base portion and said support member and located approximately on the longitudinal center line of the seat frame, track means having a curved pathway formed by radii centered at said pivotal connection, said track means being positioned and spaced forwardly of said pivotal axis and extending outwardly toward said vehicle door so that rotation of said seat frame about said pivotal axis moves the front of said seat frame from said normal forwardly facing position to a seat occupant receiving or discharging position facing said doorway, a second pivotal connection between said base portion of said seat and said seat frame located adjacent the side of said seat frame opposite said doorway, additional track means slidably supporting said seat frame, said additional track means providing a curved pathway having a radius centered on said second pivotal connection and extending rearwardly of said seat frame so that rotation of said seat frame about said second pivotal axis causes movement of the front of said seat frame from said normal forwardly facing position to a position facing away from said doorway and enlarging the space between said seat back and said doorway, said second track means being inclined to provide additional clearance between said seat back and said doorway as said seat frame is rotated about said second pivotal connection by forwardly tilting said seat back, and latching means to prevent movement of said seat frame about the pivotal connections and being actuable to permit alternate movement thereabout.

6. In vehicle seating apparatus of the class described, a seat frame positioned adjacent a vehicle doorway, said seat frame having a front surface normally facing forward of said vehicle and a seat back normally extending rearwardly of said vehicle, a seat frame track means fixed to said seat frame, a portion of said track means extending approximately parallel to said front surface and another portion of said track means extending approximately transversely to said portion, a curved trackway provided on said portion and said other portion, a common intersection provided for said trackways, a guide post fixed relative to said seat frame beneath said intersection in said normal position, guide means fixed to said guide post and being slidably associated with said trackways, additional track means formed parallel to said portion of said track means and said other portion of said track means, guide posts fixed to said seat frame in alignment with said additional track means, guide means fixed to said guide posts and slidably associated with said additional track means, said guide means fixed to said guide posts being pivotally supported on said additional track means to provide pivotal connections for said seat frame, and control means to alternately secure one of said guide posts relative to said additional track means and to permit movement of the other of said guide posts relative to said additional track means and pivotal positioning of said seat frame by relative movement of said track means on said guide post.

References Cited in the file of this patent
UNITED STATES PATENTS

| | | |
|---|---|---|
| 2,372,495 | Horner | Mar. 27, 1945 |
| 2,446,906 | Buker | Aug. 10, 1948 |
| 2,740,463 | Young | Apr. 3, 1956 |
| 2,893,473 | Pitts | July 7, 1959 |